(No Model.)
A. MAUCK.
COMBINED HORSE POWER AND JACK.
No. 306,847. Patented Oct. 21, 1884.
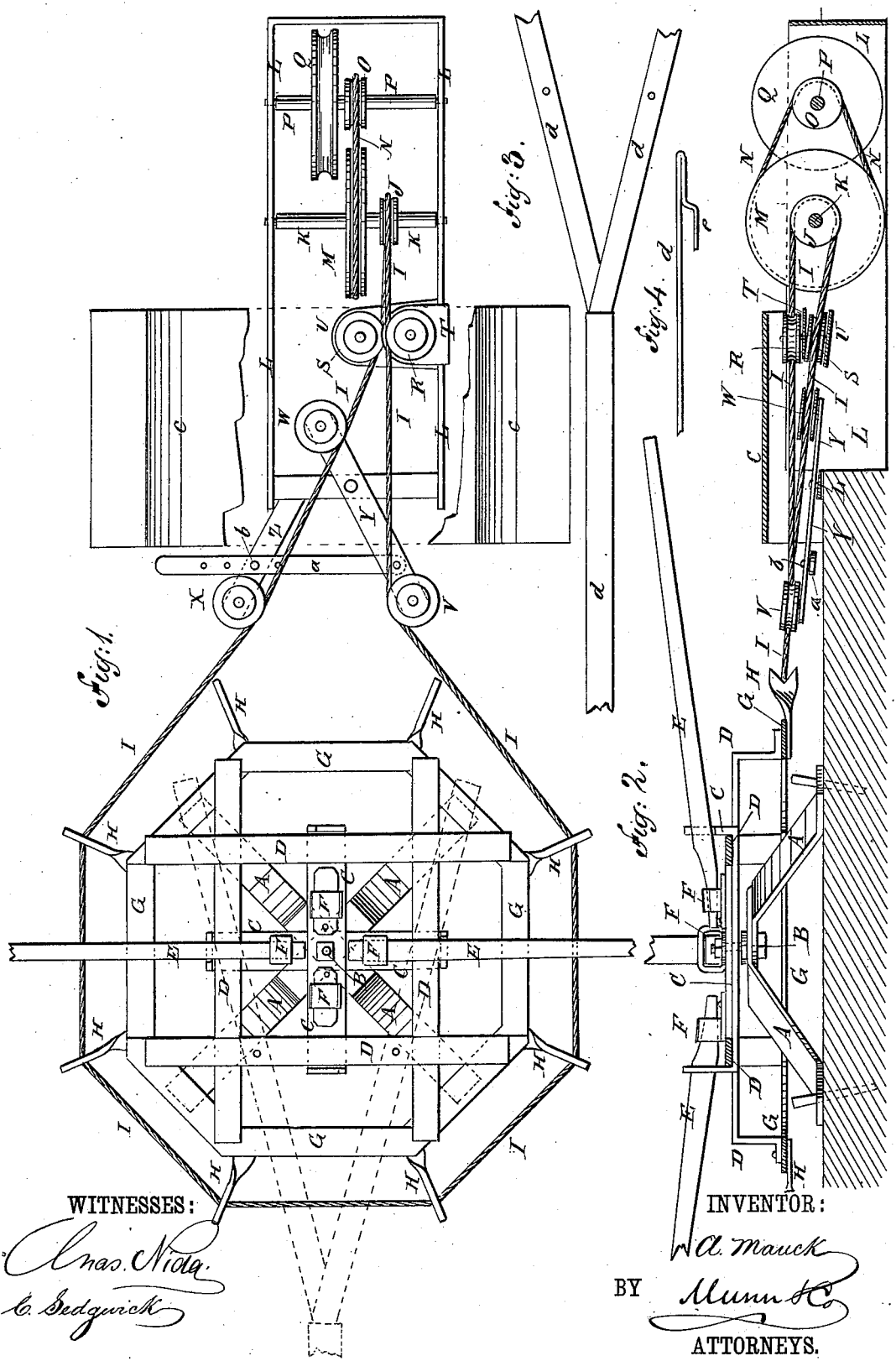
WITNESSES:
Chas. Nida.
C. Sedgwick
INVENTOR:
A. Mauck
BY Munn & Co.
ATTORNEYS.

UNITED STATES PATENT OFFICE.

ALFRED MAUCK, OF TORONTO, KANSAS.

COMBINED HORSE-POWER AND JACK.

SPECIFICATION forming part of Letters Patent No. 306,847, dated October 21, 1884.

Application filed April 2, 1884. (No model.)

*To all whom it may concern:*

Be it known that I, ALFRED MAUCK, of Toronto, in the county of Woodson and State of Kansas, have invented a new and useful Improvement in Combined Horse-Powers and Jacks, of which the following is a full, clear, and exact description.

Reference is to be had to the accompanying drawings, forming a part of this specification, in which similar letters of reference indicate corresponding parts in all the figures.

Figure 1 is a plan view of my improvement, part being broken away. Fig. 2 is a sectional side elevation of the same. Fig. 3 is a plan view of one form of sweep, parts being broken away. Fig. 4 is a side elevation of the rear end of the same.

The object of this invention is to promote simplicity in the construction of horse-powers and jacks, and convenience in adjusting such powers for machines requiring to be run at different speeds.

The invention consists in the combination, with the base-frame, of a pivoted frame having upwardly-projecting rabbeted arms, and provided with sweep-sockets and a separable wheel, to adapt the said wheel to be readily detached from its supports. The drive rope or chain is connected with pulleys connected by a short belt, and attached to shafts pivoted to a frame, whereby the machinery can be driven at greater or less speed, as may be required. The drive rope or chain is guided to and from the pulley of the jack by guide-pulleys pivoted to supports attached to the frame of the said jack. The tension of the drive rope or chain is regulated by pulleys pivoted to bars pivoted to the jack-frame and connected by an adjustable bar, as will be hereinafter fully described, and pointed out in the claims.

A represents the base-frame, which may be staked to the ground, as illustrated in Fig. 2, or bolted to a wagon when a portable power is required.

The middle part of the frame A is raised, and to its center is attached a bolt, B, which passes through the center of the frame C and serves as a journal for the said frame. The frame C is secured in place upon the bolt B by a nut screwed upon the upper end of the said bolt.

The arms of the frame C project at right angles with each other, and have offsets formed in them near their ends, to receive the bars of the frame D of the drive-wheel. The ends of the arms of the frame C, at the outer sides of the bars of the frame D, are bent upward, project above said bars, and are halved or rabbeted to form shoulders for the sides of the sweeps E to rest against. The inner ends of the sweeps E are inserted in sockets F, attached to the middle part of the frame C, so that the drive-wheel will be revolved by and with the said frame C.

The ends of the bars of the frame D are bent downward and outward, and to them is secured by bolts or other suitable means the rim G, to which are attached radially-projecting forked arms H, to receive the drive rope or chain I. The openings of the forks H are made V-shaped, as shown in Fig. 2, to prevent the drive rope or chain I from slipping.

The drive rope or chain I passes around a small pulley, J, attached to a shaft, K, which is journaled to the side bars of a frame, L. To the shaft K is also attached a large pulley, M, around which passes a short belt, N. The belt N also passes around a small pulley, O, attached to the shaft P, which is journaled to the side bars of the frame L. To the shaft P is also attached a large pulley, Q, to receive a belt connected with the machinery to be driven, but which is not shown in the drawings.

The machinery to be driven is connected with the pulley Q when great speed is required. When a slow speed is required, the belt N is detached and the machinery is driven from the pulley M. The rope or chain I is brought into position to pass to and from the pulley J by guide-pulleys R S, pivoted to supports T U, attached to a side bar of the frame L. The tension of the rope or chain I is regulated by the pulleys V W X. The pulleys V W are pivoted to the opposite ends of the bar Y, which is pivoted at a little distance from the center to the end bar of the frame L.

The pulley X is pivoted to one end of the bar Z, the other end of which is pivoted to the end bar of the frame L. To the longer arm of the bar Y, near the pulley V, is pivoted the end of the bar a, the other end of which is secured to the bar Z by a pin, b. Several holes are formed in the bar a to receive the pin b, so that the tension of the rope or chain I can be regulated by moving the pin b from the one hole to another in the said bar a.

The frame L and its attachments are designed to be wholly or partly sunk in the ground, and the inner end of the said frame, which is in the path of the horses attached to the sweeps E, is covered with a bridge, c, for the horses to walk over, to prevent the said frame and its attachment from being accidentally injured.

If desired, the drive-wheel D G H can be detached from the frame C and secured to the sweep of a machine—as a cob-crusher, for instance—while the jack is connected with another machine—as a corn-sheller, for instance—so that both machines can be driven by the same power. In this case a forked or other sweep, d, can be bolted or otherwise secured to the frame D of the drive-wheel.

In the sweep shown in Figs. 3 and 4 the forked inner end of the sweep is represented as being provided with a hook, e, to engage with a bar of the frame D and assist in securing the said sweep in place upon the said frame.

Having thus described my invention, I claim as new and desire to secure by Letters Patent—

1. The combination, with the base-frame A, of the pivoted frame C, having upwardly-projecting rabbeted arms, and provided with sweep-sockets F, and the separable wheel D G H, substantially as herein shown and described, to adapt the said wheel to be readily detached from the supports, as set forth.

2. The combination, with the frame A, the pivoted frame C, the separable wheel D G H, the sweeps E, and the rope or chain I, of the frame L, the shaft K, provided with the pulleys J M, the shaft P, provided with the pulleys O Q, the belt N, the guide-pulleys R S, and the tension-pulleys V W X, substantially as herein shown and described.

3. The combination, with the frame L, of the bar Y, pivoted to the said frame, and provided at opposite ends with the pulleys V W, the bar Z, rigidly secured to the frame, and provided with the pulley X on its end, and the bar a, pivoted to the bar Y and adjustably connected to the bar Z, substantially as herein shown and described.

ALFRED MAUCK.

Witnesses:
JOHN F. ARMSTRONG,
C. F. WEBB.